(12) United States Patent
Waerdt et al.

(10) Patent No.: US 8,376,126 B1
(45) Date of Patent: Feb. 19, 2013

(54) EQUIPMENT ATTACHMENT ADAPTER

(75) Inventors: Nicholas Vande Waerdt, Rock Valley, IA (US); Joel A. Negus, Sioux Center, IA (US); Nolan Den Boer, Rock Valley, IA (US)

(73) Assignee: Kooima Company, Rock Valley, IA (US)

( * ) Notice: Subject to any disclaimer, the term of this patent is extended or adjusted under 35 U.S.C. 154(b) by 460 days.

(21) Appl. No.: 12/793,842

(22) Filed: Jun. 4, 2010

(51) Int. Cl.
 *B65G 13/00* (2006.01)
 *A01D 75/00* (2006.01)
(52) U.S. Cl. ............ 198/780; 198/860.2; 56/3; 56/13.3
(58) Field of Classification Search .................. 198/780, 198/860.2; 56/3, 13.3, 13.6, DIG. 9; 193/4, 193/5
See application file for complete search history.

(56) References Cited

U.S. PATENT DOCUMENTS

| | | | | |
|---|---|---|---|---|
| 3,519,129 A | * | 7/1970 | Peterson | 209/671 |
| 4,557,388 A | * | 12/1985 | Peterson | 209/671 |
| 4,968,284 A | * | 11/1990 | Klimmer et al. | 460/8 |
| 5,473,872 A | * | 12/1995 | Fox et al. | 56/14.9 |
| 5,538,088 A | * | 7/1996 | Wait | 172/439 |
| 5,722,888 A | * | 3/1998 | Lane | 460/114 |
| 6,746,387 B2 | * | 6/2004 | Lane et al. | 492/47 |
| 6,818,238 B2 | * | 11/2004 | Napolitano et al. | 426/101 |
| 7,175,018 B2 | * | 2/2007 | Helgerson et al. | 198/780 |
| 7,201,713 B2 | * | 4/2007 | Lane et al. | 492/47 |

OTHER PUBLICATIONS

Kooima Company, "Header Driver Adapters", 2008 Summer & Fall Catalog, Issue 27, pg. 2.

* cited by examiner

*Primary Examiner* — Douglas Hess
(74) *Attorney, Agent, or Firm* — Jeffrey A. Proehl; Woods, Fuller, Shultz & Smith, P.C.

(57) ABSTRACT

An equipment attachment adapter apparatus may comprise a base frame and a throat structure on the base frame that defines a throat extending through the apparatus with an entry and exit. The throat structure may comprise a floor wall having an upper surface defining a lower boundary of the throat, a first side wall and a second side wall positioned on opposite sides of the throat, and an upper wall positioned above the floor wall. In some embodiments, the upper surface of the floor wall is curved from the entry toward the exit. In some embodiments, the throat is relatively larger toward the entry and relatively smaller toward the exit. In some embodiments, a feed roll is rotatably mounted on the base frame at least partially in the throat with chevron-shaped teeth.

27 Claims, 7 Drawing Sheets

EQUIPMENT ATTACHMENT ADAPTER

BACKGROUND

1. Field

The present disclosure relates to attachment adapters for equipment, and more particularly pertains to a new equipment attachment adapter with enhanced crop material flow features that enhance material flow through the adapter between an implement and agricultural equipment.

2. Description of the Prior Art

Agricultural equipment attachments often can be adapted, through the use of a suitable adapter, for use on other types of equipment than the equipment on which the attachment were originally designed to be mounted. Adapters for mounting the attachment of one manufacturer's design to the equipment of another manufacturer's design have been produced. For example, adapters have been designed for mounting grain harvesting head units or attachments of one manufacturer on forage harvester equipment of another manufacturer.

However, such adapters, while highly useful, can create problems in the movement of crop materials between the implement and the equipment, and in these respects, the equipment attachment adapter according to the present disclosure substantially avoids the problems associated with the known approaches to attachment adapters.

SUMMARY

In view of the foregoing, the present disclosure describes a new drive system for equipment attachment adapter which may be utilized to enhance crop material flow features that enhance material flow through the adapter between an implement and agricultural equipment.

The present disclosure relates to an equipment attachment adapter apparatus for mounting an implement to agricultural equipment. The adapter apparatus may comprise a base frame having a front for orienting toward the implement and a rear for orienting toward the agricultural equipment. The apparatus may also comprise a throat structure mounted on the base frame and defining a throat extending through the adapter apparatus for receiving crop materials from an output of the implement and passing the materials to an intake of the agricultural equipment. The throat has an entry for positioning adjacent to the output of the implement and an exit for positioning adjacent to the intake of the equipment. The throat structure may comprise a floor wall having an upper surface defining a lower boundary of the throat, a first side wall and a second side wall positioned on opposite sides of the throat, with the first and second side walls extending upwardly from the floor wall; and an upper wall positioned above the floor wall. The upper surface of the floor wall is curved from the entry of the throat toward the exit of the throat.

In another aspect, the disclosure relates an equipment attachment adapter apparatus for mounting an implement to agricultural equipment. The adapter apparatus may comprise a base frame having a front for orienting toward the implement and a rear for orienting toward the agricultural equipment. The apparatus may also comprise a throat structure mounted on the base frame and defining a throat extending through the adapter apparatus for receiving crop materials from an output of the implement and passing the materials to an intake of the agricultural equipment. The throat has an entry for positioning adjacent to the output of the implement and an exit for positioning adjacent to the intake of the equipment. The throat structure may comprise a floor wall having an upper surface defining a lower boundary of the throat, a first side wall and a second side wall positioned on opposite sides of the throat, with the first and second side walls extending upwardly from the floor wall; and an upper wall positioned above the floor wall. The throat may be larger toward the entry of the throat and smaller toward the exit of the throat.

In yet another aspect, the disclosure relates an equipment attachment adapter apparatus for mounting an implement to agricultural equipment. The adapter apparatus may comprise a base frame having a front for orienting toward the implement and a rear for orienting toward the agricultural equipment. The apparatus may also comprise a throat structure mounted on the base frame and defining a throat extending through the adapter apparatus for receiving crop materials from an output of the implement and passing the materials to an intake of the agricultural equipment. The throat has an entry for positioning adjacent to the output of the implement and an exit for positioning adjacent to the intake of the equipment. The throat structure may comprise a floor wall having an upper surface defining a lower boundary of the throat, a first side wall and a second side wall positioned on opposite sides of the throat, with the first and second side walls extending upwardly from the floor wall; and an upper wall positioned above the floor wall. The apparatus may comprise a feed roll rotatably mounted on the base frame to facilitate movement of the crop materials through the throat, and the feed roll is positioned at least partially in the throat. The feed roll may comprise a central shaft and a plurality of teeth mounted on and extending radially outwardly from the central shaft. Each of the teeth may have a chevron shape.

There has thus been outlined, rather broadly, some of the more important elements of the invention in order that the detailed description thereof that follows may be better understood, and in order that the present contribution to the art may be better appreciated. There are additional elements of the invention that will be described hereinafter and which will form the subject matter of the claims appended hereto.

In this respect, before explaining at least one embodiment or implementation in greater detail, it is to be understood that the scope of the invention is not limited in its application to the details of construction and to the arrangements of the components set forth in the following description or illustrated in the drawings. The invention is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present invention.

The advantages of the various embodiments of the present invention, along with the various features of novelty that characterize the invention, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

Figure 1:
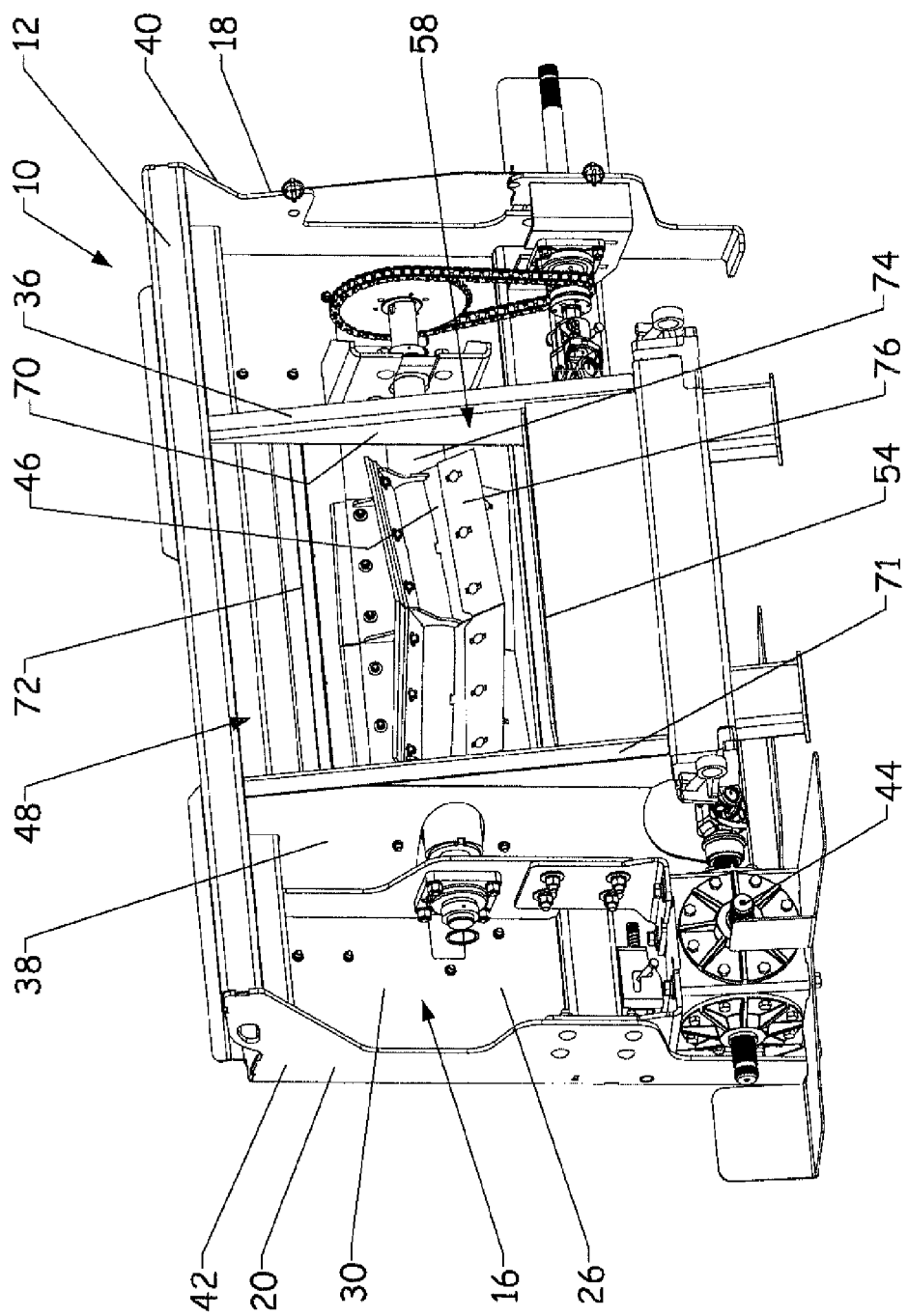
FIG. 1 is a schematic rear perspective view of the adapter apparatus, according to an illustrative embodiment.
Figure 2:
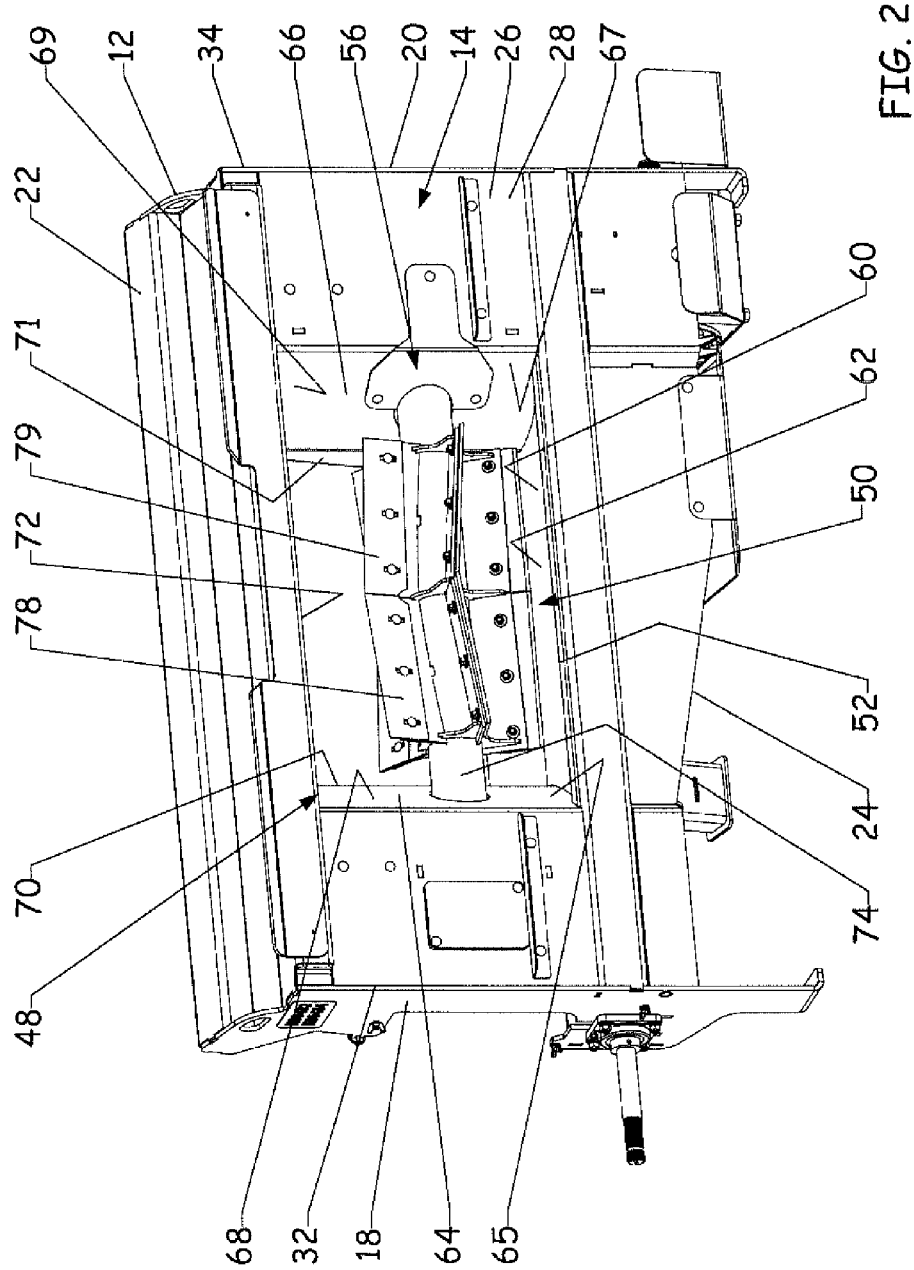
FIG. 2 is a schematic front perspective view of the adapter apparatus according to the present disclosure.
Figure 3:
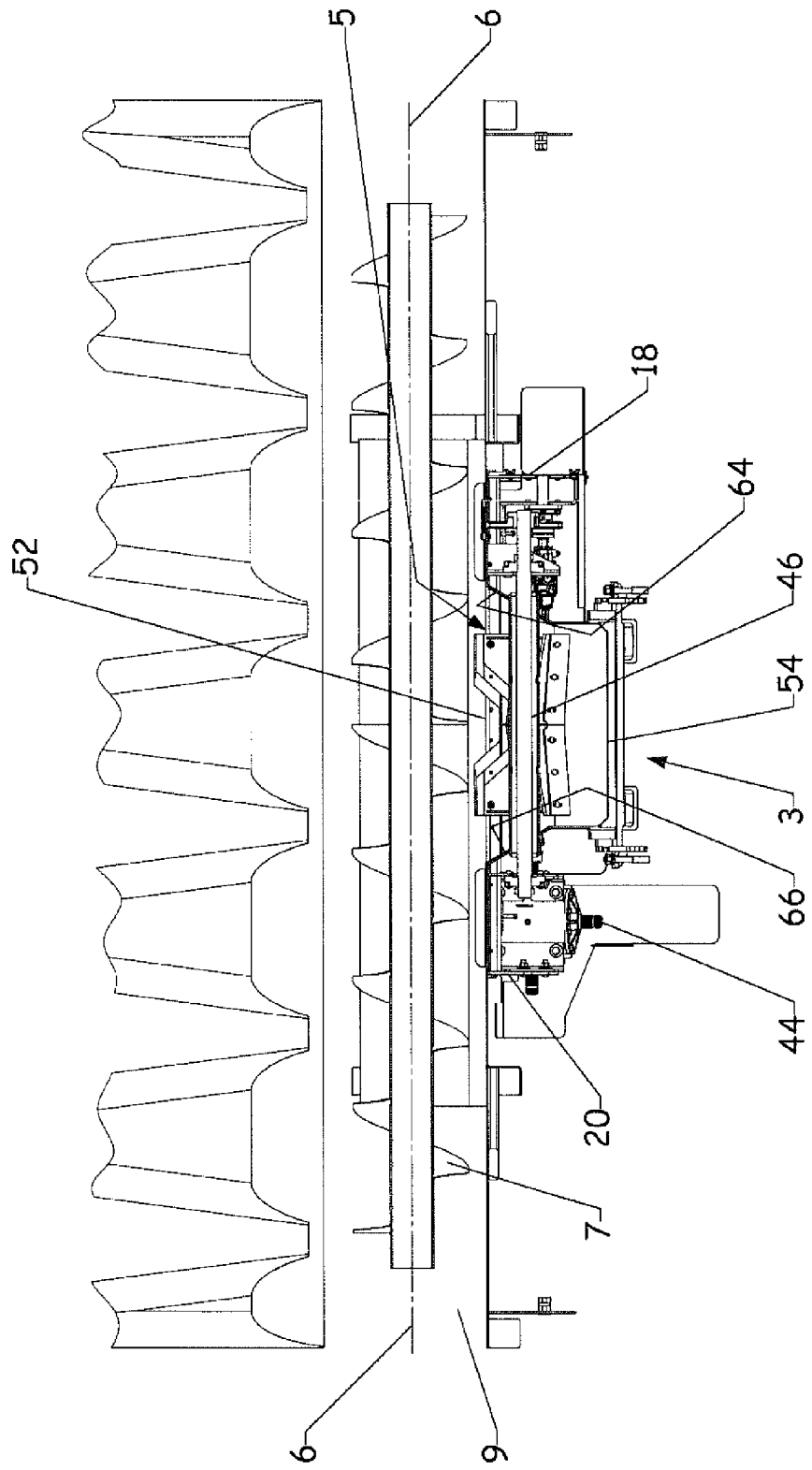
FIG. 3 is a schematic top view of the adapter apparatus, according to an illustrative embodiment.

With reference now to the drawings, and in particular to FIGS. 1 through 7 thereof, a new equipment attachment adapter embodying the principles and concepts of the disclosed subject matter will be described.

The system 1 of the disclosure may broadly include an item or article of agricultural equipment 2 in some embodiments. The article of agricultural equipment 2 may include an intake 3 for receiving crop materials for processing by the equipment. The intake 3 may have an intake opening located at the front of the agricultural equipment. The agricultural equipment 2 may also have a first mounting structure on which an implement is intended to mount. In some embodiments, the agricultural equipment 2 comprises a harvester, such as a forage harvester, although the disclosure is not limited to these particular types of equipment and may be used on other types of equipment.

The system may also broadly include an implement 4 to be mounted on the agricultural equipment 2, and may be any one of a number of types of implements, but typically comprises an implement configured to gather crop materials for processing by the equipment 2. The implement 4 may have a second mounting structure for mounting the implement on the agricultural equipment, however, the first mounting structure of the equipment and the second mounting structure of the implement may be incompatible for directly mounting together. The implement 4 may have an output 5 for outputting the crop materials gathered by the implement.

In an illustrative embodiment of the system 1 that will be described in this disclosure, the implement 4 comprises a harvester head adapter is employed that adapts one type or manufacture of harvester head attachment assembly to another type or manufacture of harvester equipment assembly. The harvester head implement 4 may have a transverse crop material movement path 6 which may be oriented substantially perpendicular to the direction of forward movement of the agricultural equipment when in operation. The implement 4 may have at least one transverse auger 7 that moves crop materials toward a substantially central location on the implement 4. The transverse auger 7 may move the crop materials toward the output 5. The transverse augers may move the crop materials across a deck 9 forming a bottom of the crop material path 6, and the deck 9 may extend to the output 5 to support the crop materials as they are moved by the augers to the output.

More specifically, the system 10 includes an adapter apparatus 10 that forms the primary physical interface between the first mounting structure on the equipment 2 and the second mounting structure on the implement 4, such that the implement is not directly connected to the equipment for support. Although the adapter apparatus 10 is illustratively described herein in the context of attaching a harvester head to a harvester, the adapter apparatus 10 may be adapted to work with a wide variety of equipment and implement pairings. As the particulars of the mounting structures will vary with the types and brands of equipment and implements, the first and second mounting structures will not be further described here, as suitable structures will be readily understood by those skilled in the art.

The adapter apparatus 10 may include an adapter base frame 12, or simply the base frame, that has a front 14 for orienting toward the implement 4 and a rear 16 for orienting toward the equipment assembly 2. The adapter base frame 12 may be elongated in a horizontal direction when oriented for use, and may have a first end 18, a second end 20, as well as a top 22 that extends between the first 18 and second 20 ends, and a bottom 24 that also extends between the first and second ends. In some embodiments, the ends 18, 20 of the base frame 12 may be oriented substantially parallel to each other, and may be substantially vertical, while the top 22 and bottom 24 may also be oriented substantially parallel to each other, and may be substantially horizontal, although these relationships and orientations are not critical to the invention.

A wall 24 may be included on the adapter base frame 12, and the wall may have a front face 26 and a rear face 28. The wall 24 may have a first end edge 32 positioned adjacent to the first end 18 of the base frame and may have a second end edge 34 positioned adjacent to the second end 20 of the base frame. The first 32 and second 34 end edges may have substantially vertical orientations when the system 10 is positioned for mounting on the equipment assembly 2 and the implement 4, although against this is not critical.

The adapter base frame 12 may include at least one support rib 36 mounted on the rear of the adapter base frame, and may in some embodiments include a pair 36, 38 of support ribs. The support ribs may extend substantially parallel to one of the ends 18, 20 of the adapter base frame. The ribs 36, 38 may be substantially vertically oriented when the base frame 12 is positioned for use. The rib or ribs may extend from the top 22 of the base frame to the bottom 24 of the base frame. The adapter base frame 12 may also include a pair of end ribs 40, 42 each mounted on one of the respective ends 18, 20 of the base frame.

An operating shaft 44 may be rotatably mounted on the base frame 12, and may be rotatably mounted on the support ribs 36, 38, and may be rotatably mounted on at least one of the end ribs 40, 42. The operating shaft 44 may be adapted to transmit power to the implement 4, and the adaptation will vary with the type and brand of the implement. For example, the ends of the operating shaft may have gears or sprockets mounted thereon for transmitting the rotation of the operating shaft to the appropriate gears or sprockets mounted on the implement. A feed roll 46 may be mounted on the base frame 12 and may be operatively connected to the operating shaft 44 such that the feed roll rotates with the operating shaft. The feed roll 46 may facilitate the flow of crop materials through the adapter base frame 12 from the implement to the equipment, and optional features of the feed roll will be described in greater detail herein.

The adapter apparatus 10 may further include a throat structure that defines a throat 50 for receiving the crop materials passing through the adapter assembly 10 as the materials move between the output 5 of the implement 4 and the intake 3 of the agricultural equipment 2. The throat 50 may extend through the adapter apparatus 10, and through the wall 26 of the base frame 12. The throat 50 may have an entry 52 and an exit 54, with the entry being positioned toward the implement 4 and the exit being oriented toward the equipment when the adapter apparatus 10 is mounted for use. The throat 50 may have a first portion 56 positioned toward the entry of the throat and positioned toward the front 14 of the adapter base frame, and may have a second portion 58 positioned toward the exit 54 of the throat and positioned toward the rear 16 of the adapter base frame. The throat structure 48 may be mounted on and supported by the base frame 12.

In some embodiments of the adapter apparatus 10, the throat structure 48 may comprise a floor wall 60 having an upper surface 62 that defines a lower boundary of the throat. In some embodiments, the upper surface 62 of the floor wall may be curved from the entry 52 of the throat toward the exit 54 of the throat, and in further embodiments, the upper surface is curved from the entry to the exit (see, e.g., FIG. 4), while in other embodiments the upper surface is curved for a portion of the distance between the entry and exit. The upper surface 62 may be curved about an axis that extends in a direction transverse to a direction of travel of the equipment.

Figure 4:
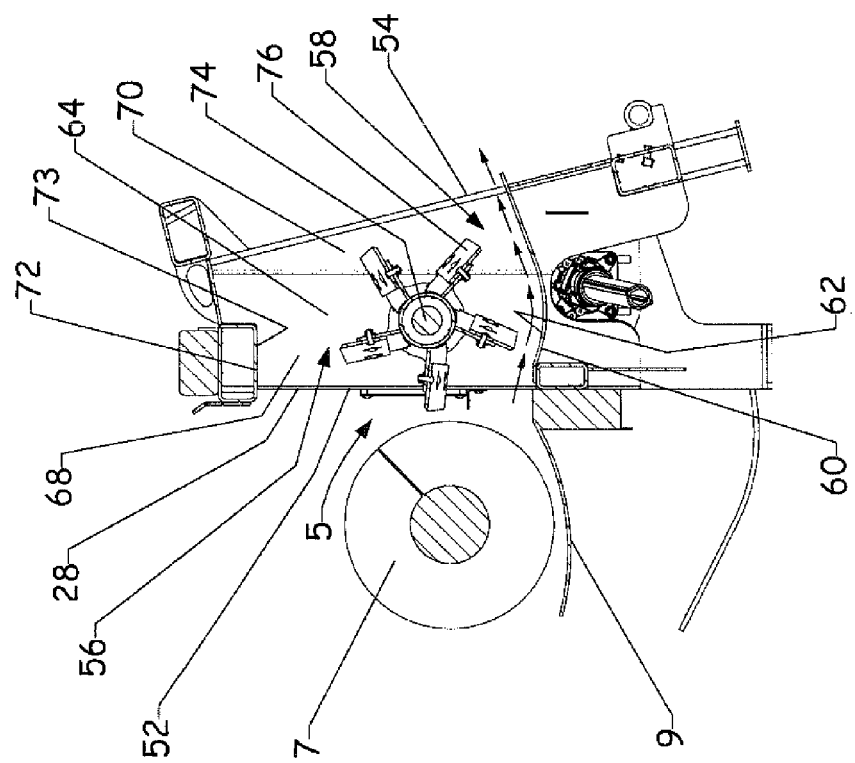
FIG. 4 is a schematic side sectional view of one illustrative embodiment of the adapter apparatus.
Figure 5:
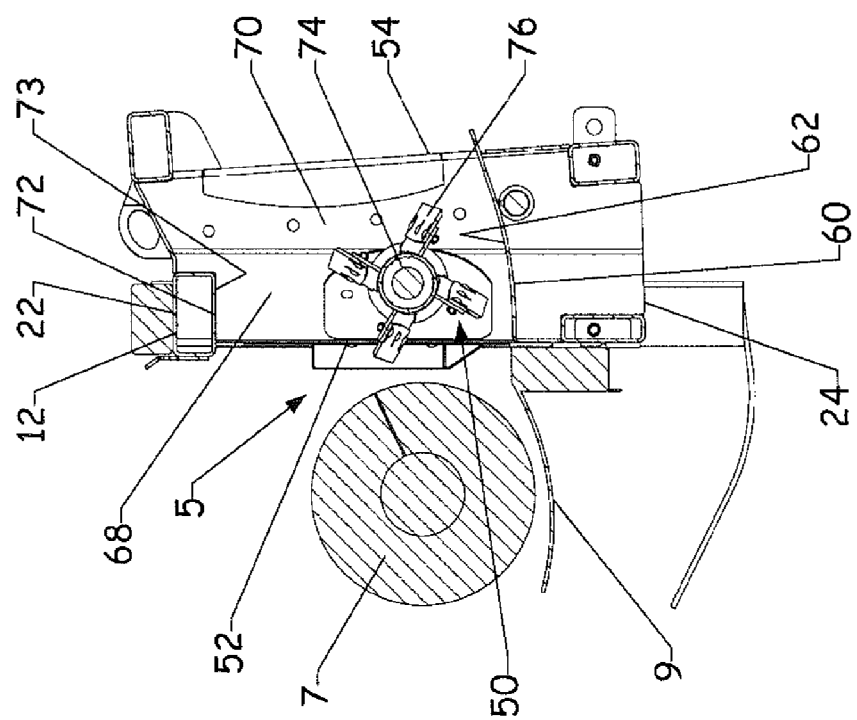
FIG. 5 is a schematic side sectional view of another illustrative embodiment of the adapter apparatus.
Figure 6:
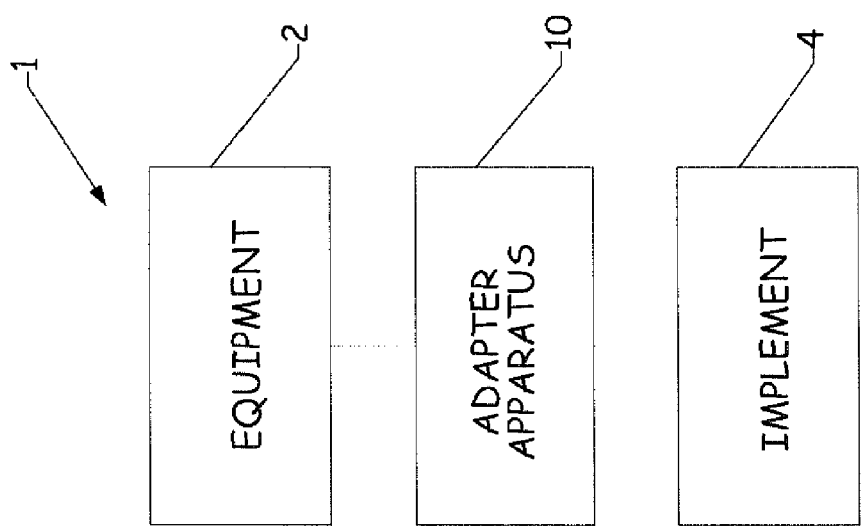
FIG. 6 is a schematic diagram of the system including the implement and article of agricultural equipment.
Figure 7:
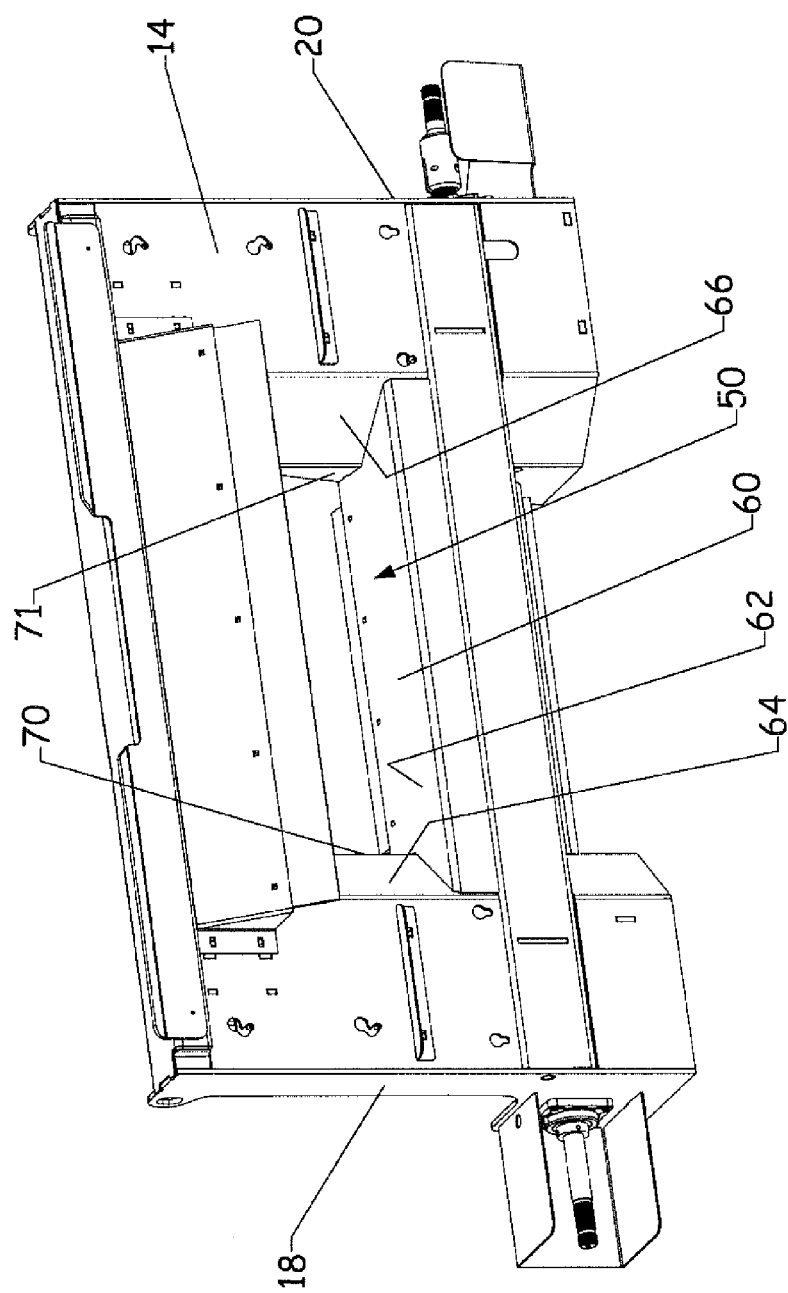
FIG. 7 is a schematic front perspective view of another embodiment of the adapter apparatus.

In some embodiment, such as is shown in FIG. 4, the upper surface 62 of the floor wall extends downwardly in the first portion 56 of the throat, and the upper surface 62 extends upwardly from the first portion in the second portion 58 of the throat. In other embodiments, such as is shown in FIG. 5, the upper surface 62 of the floor wall in the first portion 56 of the throat extends substantially horizontally from the entry and the upper surface extends upwardly from the first portion in the second portion 58.

Significantly, in the described embodiments, the upper surface 62 of the floor in the first portion 56 is substantially horizontal or slightly inclined downwardly to facilitate movement of the crop materials from the deck of the implement below the augers to the upper surface of the floor wall to be engaged by the feed roll 46 and moved through the throat. This orientation of the upper surface 62 of the floor wall, at least in the first portion 56 of the throat, provides better crop material flow than those configurations where the crop materials must be moved across a surface that is inclined upwardly from the entry 52 to the exit 54 of the throat.

The throat structure 48 may further comprise a first side wall 64 and a second side wall 66 that are positioned on opposite sides of the throat 50. The first side wall 64 may have a first side surface 65 and the second side wall 66 having a second side surface 67.

The side surfaces 65, 67 may be positioned in opposition to each other on opposite sides of the throat, and may define side boundaries of the throat. The first 64 and second 66 side walls may extend upwardly from the floor wall, In some embodiments of the adapter apparatus 10, a significant feature is the character of the size of the throat between the entry 52 and the exit 54. The throat 50 may be relatively larger toward the entry 52 of the throat and relatively smaller toward the exit 56 of the throat. The throat 50 may have a cross sectional area that is measured in a transverse plane oriented substantially perpendicular to a direction of travel of the equipment. The cross sectional area of the throat in transverse planes toward the entry 52 may be relatively greater in size than the cross sectional area of the throat in transverse planes toward the exit 54 of the throat.

The first side surface 65 and the second side surface 67 may each have a first section 68 in the first portion 56 of the throat. The first sections 68, 69 of the first and second side surfaces may diverge away from each other toward the entry 53 of the throat, and may converge toward each other toward the exit of the throat. The first section 68 of the first side surface 65 and the first section 69 of the second side surface 67 are each oriented at an angle with respect to a transverse plane. Illustratively, the angle between the side surfaces 65, 67 and the transverse plane may measure between approximately 30 degrees and approximately 60 degrees, although it is possible that other angles may be employed.

Significantly, the angled side surfaces 65, 67 may help to guide the crop materials to and through the throat as the area size of the entry 52 is enlarged while the size of the exit may be configured to correspond to the area size of the exit 54. The crop materials are able to make a gentler change of direction from the movement caused by the transverse augers and the movement through the throat which may be assisted by the feed roll 46. Designs where the transition between the front face 28 of the wall 26 and the side surfaces 65, 67 is approximately 90 degrees tend to not move the crop materials as efficiently between the transverse auger and the feed roll 46, and may cause an undesirable accumulation of the materials at this location.

The first side surface 65 and the second side surface 67 may each have a second section 70, 71 in the second portion 58 of the throat. The second sections 70, 71 of the first and second side surfaces may extend substantially parallel to each other such that the cross sectional area of the throat in the second section is substantially uniform in size.

The throat structure 48 may also comprise an upper wall 72 that is positioned above the floor wall 60, and the upper wall may have a lower surface 73 that defines an upper boundary of the throat. The lower surface 73 of the upper wall is generally positioned in opposition to the upper surface 62 of the floor wall, and extends between the first side wall 64 and the second side wall 66.

The feed roll 46 is rotatably mounted on the base frame 12 to facilitate movement of the crop materials through the throat 50, and may be mounted at least partially in the throat. In some embodiments, the feed roll 46 may be mounted in the first portion of the throat, although portions of the feed roll may extend into the second portion and also may extend out of the throat.

The feed roll 46 may comprise a central shaft 74 which may be rotatably mounted on the base frame 12. The central shaft 74 may extend through the side walls 64, 66 of the throat structure 48, and may in some extend through the first sections 68, 69 of the side surfaces 65, 67. The central shaft 74 is generally horizontally oriented such that the feed roll rotates about a substantially horizontal axis. The feed roll may further include a plurality of teeth 76 that are mounted on the central shaft 74 such that the plurality of teeth rotates with the central shaft. The teeth 76 generally extend radially outwardly from the central shaft. The teeth may have a paddle or tine configuration.

In some embodiments each of the teeth has a chevron shape to aid in the guidance of the crop materials toward the center of the throat as the crop materials are pulled into the throat by the feed roll. In greater detail, each of the teeth 76 may have a substantially V-shape, with the apex of the V being located at a center of the tooth. The teeth are oriented such that the outward ends of the teeth lead the center portion of the tooth when the feed roll is rotated. Each of the teeth 76 may have a first side portion 78 and a second side portion 79, and the first side portion and the second side portion converge together at the center, and the converging ends of the first 78 and second 79 side portions are located forwardly of the diverging ends of the side portions 78, 79. Significantly, this tooth shape is advantageous over tooth shapes in which the tooth is relatively straight, which simply tends to only move the crop materials straight rearwardly through the throat.

It should be recognized that the disclosure encompasses configurations with combination of features beyond that in the illustrative embodiments, and therefore embodiments including the tapered throat but not the curved upper surface of the floor wall or the feed roll, embodiments including the curved upper surface of the floor wall but not the tapered throat or the feed roll, and embodiments including the tapered throat and curved floor wall upper surface, but not the feed roll, are contemplated in this disclosure.

With respect to the above description then, it is to be realized that the optimum dimensional relationships for the parts of the invention, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

We claim:

1. An equipment attachment adapter apparatus for mounting an implement to agricultural equipment, the adapter apparatus comprising:
    a base frame having a front for orienting toward the implement and a rear for orienting toward the agricultural equipment;
    a throat structure mounted on the base frame and defining a throat extending through the adapter apparatus for receiving crop materials from an output of the implement and passing the materials to an intake of the agricultural equipment, the throat having an entry for positioning adjacent to the output of the implement and an exit for positioning adjacent to the intake of the equipment, the throat structure comprising:
        a floor wall having an upper surface defining a lower boundary of the throat;
        a first side wall and a second side wall positioned on opposite sides of the throat, the first and second side walls extending upwardly from the floor wall; and
        an upper wall positioned above the floor wall;
        wherein the upper surface of the floor wall is curved from the entry of the throat toward the exit of the throat.

2. The apparatus of claim 1 additionally comprising a feed roll rotatably mounted on the base frame to facilitate movement of the crop materials through the throat, the feed roll being positioned at least partially in the throat.

3. The apparatus of claim 2 wherein the feed roll comprises a central shaft and a plurality of teeth mounted on and extending radially outwardly from the central shaft, each of the teeth having a chevron shape.

4. The apparatus of claim 1 wherein the upper surface is curved about an axis extending in a direction transverse to a direction of travel of the equipment.

5. The apparatus of claim 1 wherein the upper surface of the floor wall extends downwardly in a first portion of the throat.

6. The apparatus of claim 5 wherein the upper surface of the floor wall extends upwardly from the first portion in the second portion of the throat.

7. The apparatus of claim 1 wherein the upper surface of the floor wall extends substantially horizontally in the first portion of the throat.

8. The apparatus of claim 7 wherein the upper surface of the floor wall extends upwardly in the second portion of the throat.

9. An equipment attachment adapter apparatus for mounting an implement to agricultural equipment, the adapter apparatus comprising:
    a base frame having a front for orienting toward the implement and a rear for orienting toward the agricultural equipment;
    a throat structure mounted on the base frame and defining a throat extending through the adapter apparatus for receiving crop materials from an output of the implement and passing the materials to an intake of the agricultural equipment, the throat having an entry for positioning adjacent to the output of the implement and an exit for positioning adjacent to the intake of the equipment, the throat structure comprising:
        a floor wall having an upper surface defining a lower boundary of the throat,
        a first side wall and a second side wall positioned on opposite sides of the throat, the first and second side walls extending upwardly from the floor wall; and
        an upper wall positioned above the floor wall;
        wherein the throat is larger toward the entry of the throat and smaller toward the exit of the throat.

10. The apparatus of claim 9 additionally comprising a feed roll rotatably mounted on the base frame to facilitate movement of the crop materials through the throat, the feed roll being positioned at least partially in the throat.

11. The apparatus of claim 9 wherein the throat has a cross sectional area in a transverse plane oriented substantially perpendicular to a direction of travel of the equipment when the adapter apparatus is mounted on the equipment, and the cross sectional area of the throat in transverse planes toward entry of the throat are greater than the cross sectional area of the throat in transverse planes toward the exit of the throat.

12. The apparatus of claim 9 wherein the first side wall has a first side surface and the second side wall has a second side surface positioned in opposition to each other, the first side surface and the second side surface each have a first section in a first portion of the throat, the first sections of the first side surface and the second side surface diverging away from each other toward the entry of the throat and converging toward the exit of the throat.

13. The apparatus of claim 12 wherein the first side surface and the second side surface each have a second section in a second portion of the throat, the second sections of the first side surface and the second side surface extending substantially parallel to each other.

14. The apparatus of claim 9 wherein the first side wall has a first side surface and the second side wall has a second side surface positioned in opposition to each other, the first side surface and the second side surface each have a first section in a first portion of the throat, wherein the first sections of the first side surface and the second side surface are oriented at an angle with respect to a transverse plane, the angle having a measure between approximately 30 degrees and approximately 60 degrees.

15. The apparatus of claim 9 wherein the upper surface of the floor wall is curved from the entry of the throat toward the exit of the throat.

16. The apparatus of claim 9 wherein the upper surface of the floor wall is curved from the entry of the throat to the exit of the throat.

17. An equipment attachment adapter apparatus for mounting an implement to agricultural equipment, the adapter apparatus comprising:

a base frame having a front for orienting toward the implement and a rear for orienting toward the agricultural equipment;

a throat structure mounted on the base frame and defining a throat extending through the adapter apparatus for receiving crop materials from an output of the implement and passing the materials to an intake of the agricultural equipment, the throat having an entry for positioning adjacent to the output of the implement and an exit for positioning adjacent to the intake of the equipment, the throat structure comprising:
- a floor wall having an upper surface defining a lower boundary of the throat,
- a first side wall and a second side wall positioned on opposite sides of the throat, the first and second side walls extending upwardly from the floor wall; and
- an upper wall positioned above the floor wall; and a feed roll rotatably mounted on the base frame to facilitate movement of the crop materials through the throat, the feed roll being positioned at least partially in the throat, the feed roll comprising a central shaft and a plurality of teeth mounted on and extending radially outwardly from the central shaft; and wherein each of the teeth has a chevron shape.

18. The apparatus of claim 17 wherein each of the teeth has V-shape.

19. The apparatus of claim 17 wherein each of the teeth has a first side portion and a second side portion, the first side portion and the second side portion converging together.

20. The apparatus of claim 19 wherein converging ends of the first and second side portions are located forwardly of diverging ends of the first and second side portions.

21. The apparatus of claim 17 wherein the upper surface of the floor wall is curved from the entry of the throat toward the exit of the throat.

22. The apparatus of claim 17 wherein the throat is larger toward the entry of the throat and smaller toward the exit of the throat.

23. An equipment attachment adapter apparatus for mounting an implement to agricultural equipment, the adapter apparatus comprising:

a base frame having a front for orienting toward the implement and a rear for orienting toward the agricultural equipment;

a throat structure mounted on the base frame and defining a throat extending through the adapter apparatus for receiving crop materials from an output of the implement and passing the materials to an intake of the agricultural equipment, the throat having an entry for positioning adjacent to the output of the implement and an exit for positioning adjacent to the intake of the equipment, the throat structure comprising:
- a floor wall having an upper surface defining a lower boundary of the throat;
- a first side wall and a second side wall positioned on opposite sides of the throat, the first and second side walls extending upwardly from the floor wall; and
- an upper wall positioned above the floor wall;
- wherein a portion of the upper surface of the floor wall is curved between the entry of the throat and the exit of the throat.

24. The apparatus of claim 23 additionally comprising a feed roll rotatably mounted on the base frame to facilitate movement of the crop materials through the throat, the feed roll being positioned at least partially in the throat.

25. The apparatus of claim 24 wherein the feed roll comprises a central shaft and a plurality of teeth mounted on and extending radially outwardly from the central shaft, each of the teeth having a chevron shape.

26. The apparatus of claim 23 wherein the upper surface is curved about an axis extending in a direction transverse to a direction of travel of the equipment.

27. The apparatus of claim 23 wherein the upper surface of the floor wall extends substantially horizontally in a first portion of the throat.

* * * * *